Patented Aug. 12, 1924.

1,504,911

UNITED STATES PATENT OFFICE.

ALFRED SCHINDLER-JENNY, OF LEUGGELBACH, GLARUS, SWITZERLAND, ASSIGNOR TO THE FIRM GALLATIN & CIE., OF LEUGGELBACH, GLARUS, SWITZERLAND.

BOLUS GAUZE.

No Drawing.   Application filed April 24, 1922. Serial No. 556,337.

*To all whom it may concern:*

Be it known that I, ALFRED SCHINDLER-JENNY, a citizen of the Republic of Switzerland, residing at Leuggelbach, Glarus, Switzerland, have invented a certain new and useful Improvement in a Method for Making Bolus Gauze, of which the following is a specification.

It is known that bolus alba is capable of absorbing secretions of any kind and that it acts thus desiccatively. White alumina applied to ichoring sores acts very efficiently in a deodorizing manner as it checks the growth of bacteria. These qualities are the reason that bolus alba is not only considered as an indispensable means in gynecological therapeutics but it is often utilized by surgeons for powdering aseptic sores and for treating suppurating processes.

The object of the Swiss Patent No. 87672 is a method for making a gauze or bandage that is richly impregnated with bolus. The method consists in treating the gauze with a moistened mixture of bolus alba and acetate of alumina for the purpose of fixing bolus alba to the gauze and in drying thereafter the gauze treated in this way slowly in air. There are certain objections to the gauze made according to this Swiss patent, such as the bolus alba did not adhere well to the gauze, it was very dusty and the coating readily came off during handling, upon sterilization in steam and contact with moisture it became hard and flaked off the gauze and was no longer flexible.

The problem was to prevent these disadvantages without destroying the therapeutic properties of the bolus alba.

After considerable experimentation these difficulties have been overcome, and I have found that not every acetate of alumina is suited for causing a good fixation of the bolus alba to the gauze, but that a special concentration and composition of the ingredients for obtaining acetate of alumina has proved to be advantageous for this purpose. The gauze impregnated in this manner remains soft and supple even after a many times repeated sterilization by vapour and the bolus alba will still be fixed sufficiently. According to the invention the gauze is impregnated by ingredients of the following composition:

4 kilogrammes of sterilized bolus alba are formed into a doughy mass by adding 1 kilogram of boiled hot water and are thereafter mixed with 8 kilogrammes of acetate of alumina and 125 grammes of formaldehyde of 40% concentration. The acetate of alumina is obtained by mixing 35 kilogrammes of triply refined acetate of lead, 35 kilogrammes of alum and 140 litres of water. Through the dough or paste obtained hydrophile gauze is caused to pass in an impregnating machine and the gauze thus treated is dried slowly in the air at normal room temperature.

The gauze manufactured in this manner can be sterilized in a simple manner and any number of times.

Moreover the gauze does not cause a staining of the bandages as for instance vioform-gauze does in a very undesirable manner. Metallic clamps for sores are for instance stained intensely yellow by vioform and they cannot be cleaned again, this disadvantage is not inherent to the bolus-gauze.

I claim:

1. A bolus gauze comprising bolus alba rendered adherent to gauze by aluminum acetate resulting from the reaction of about equal weights of acetate of lead and alum in about four parts by weight of water.

2. A gauze having bolus alba rendered adherent thereto by about double its weight of aluminum acetate obtained by reacting with acetate of lead on alum in substantially equal weights.

In testimony whereof I affix my signature.

Dr. ALFRED SCHINDLER-JENNY.